United States Patent [19]

Brown

[11] 4,401,166
[45] Aug. 30, 1983

[54] FURROW FOLLOWER VISION CORRECTION SYSTEM

[75] Inventor: Sam J. Brown, Cozad, Nebr.

[73] Assignee: Sam J. Brown Land and Cattle Company, Inc., Cozad, Nebr.

[21] Appl. No.: 298,103

[22] Filed: Aug. 31, 1981

[51] Int. Cl.³ ............................................ A01B 69/00
[52] U.S. Cl. .................................. 172/430; 33/185 V
[58] Field of Search ................. 172/430; 33/264, 286, 33/185 V

[56] References Cited

U.S. PATENT DOCUMENTS

| 2,538,112 | 1/1951 | Maier ..................................... 33/264 |
| 2,559,761 | 7/1951 | Fulton ................................... 33/264 |
| 2,827,704 | 3/1958 | Hunsicker ............................ 33/264 |

FOREIGN PATENT DOCUMENTS 727498 11/1942 Fed. Rep. of Germany ...... 172/430

Primary Examiner—Richard T. Stouffer
Assistant Examiner—William H. Honaker
Attorney, Agent, or Firm—Zarley, McKee, Thomte, Voorhees & Sease

[57] ABSTRACT

A vision correction device for enabling a tractor to be maintained in centered relation over a guide furrow or the like includes a sighting device and a mounting strip for supporting the sighting device on a tractor forwardly of the operator seat and with freedom of transverse movement relative to the longitudinal center line of the tractor. A lock mechanism is provided for securing the sighting device in a selected transverse position whereby upon adjusting the sighting device to intersect a line of sight from the dominant eye of an operator on the operator seat to a ground furrow situated forwardly and centrally of the tractor, the tractor may be maintained in centered relation over the ground furrow by steering the tractor to maintain the sighting device in alignment with the ground furrow.

7 Claims, 5 Drawing Figures

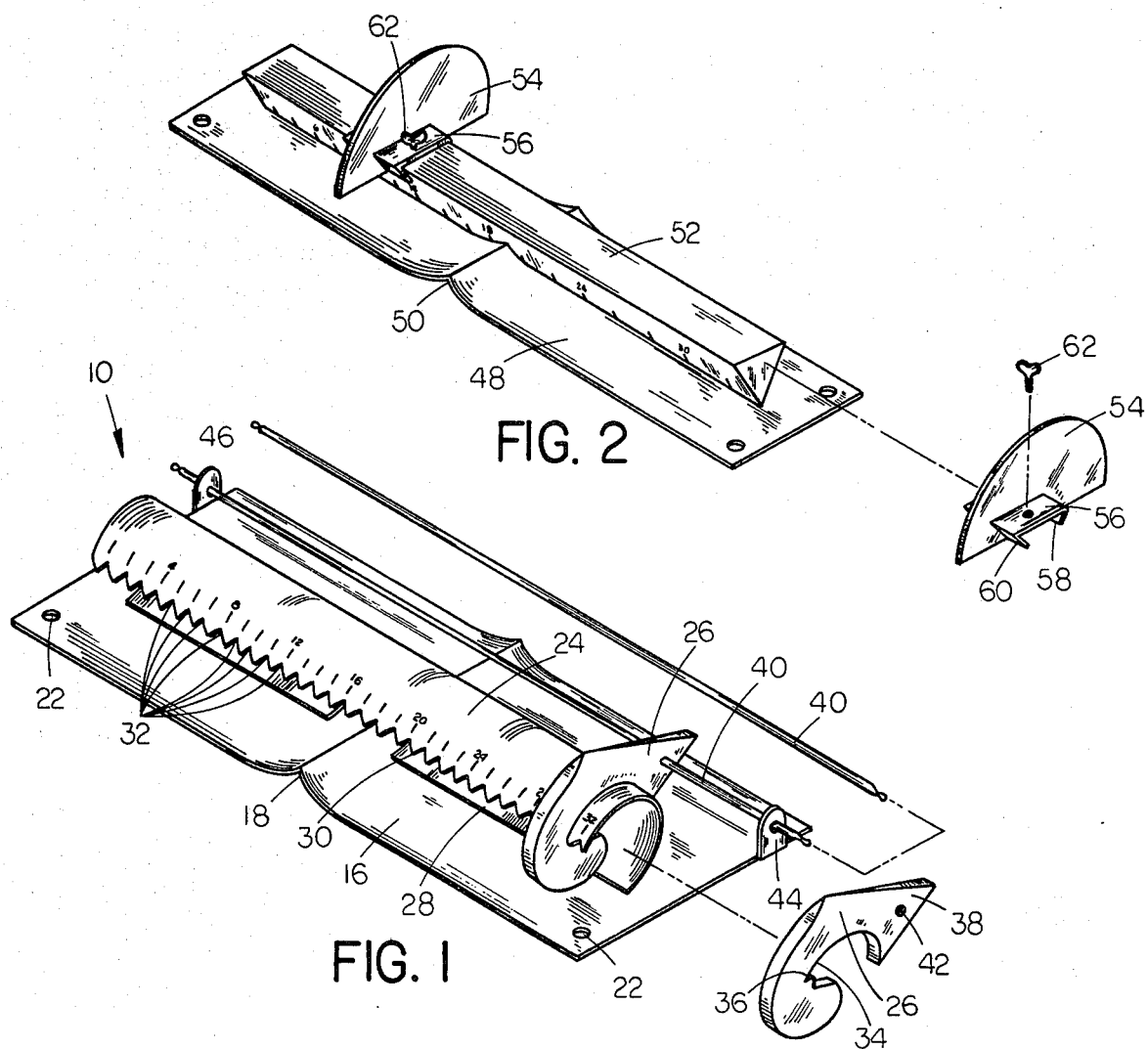
FIG. 2
FIG. 1
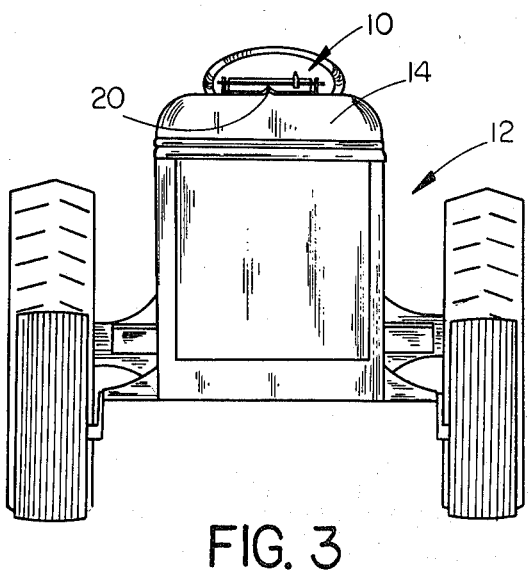
FIG. 3

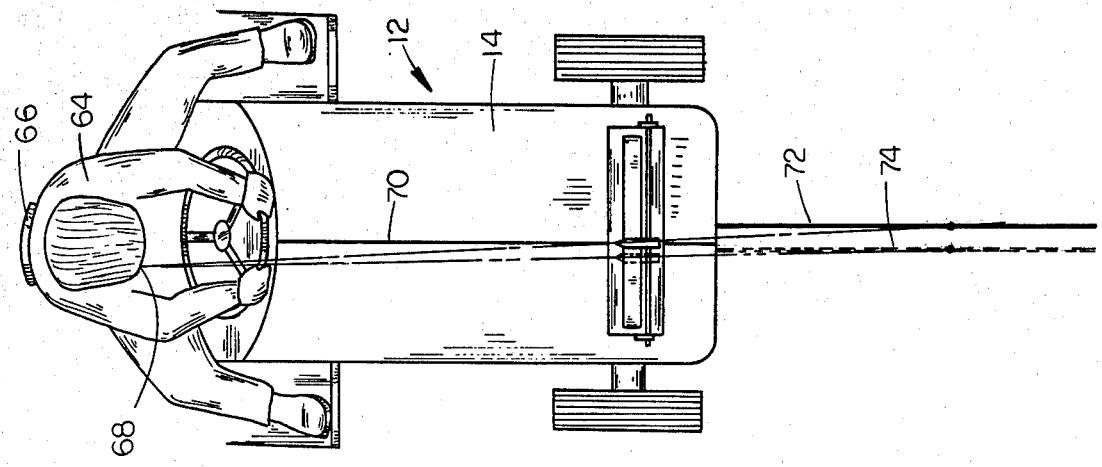
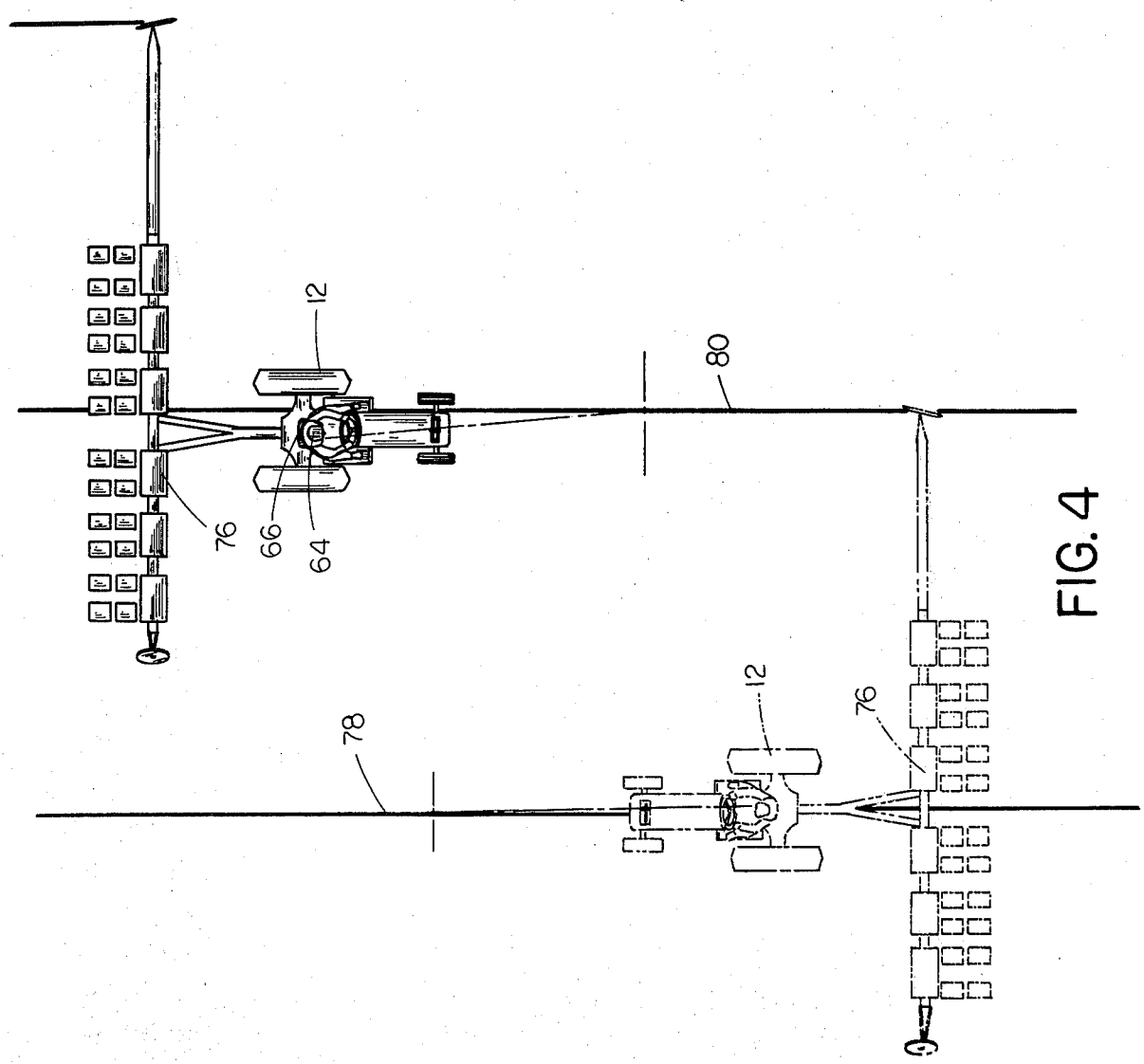
FIG. 5
FIG. 4

FURROW FOLLOWER VISION CORRECTION SYSTEM

BACKGROUND OF THE INVENTION

The present invention is directed generally to a vision correction system to enable a tractor operator to properly center the tractor over a guide furrow or the like, and more particularly to a system which is adjustable to accommodate different drivers for the same tractor.

When planting row crops such as corn, the planter implement is provided with a transversely extended boom having a row marker disc on the end thereof which makes a guide furrow in the ground. On the next pass through the field, the farmer need only center his tractor over the guide furrow made during the previous pass to properly position the planter implement relative to the previously planted rows.

Maintaining a tractor in centered relation over a guide furrow has proved to be a difficult task however. Most farmers will say that the planting implement pulls to one side and that they therefore drive to one side or the other of their planting mark to compensate for this. They also then have to set their marker disc out on one side more than the other. At the end of a full day of planting, it may be difficult to remember which side of the guide furrow the farmer should offset the tractor since this changes depending upon the direction of travel across a field.

Another problem is caused by more than one driver operating a particular tractor. Marker discs as adjusted for one driver may not work for another driver. Readjustment of the marker disc is difficult and time consuming.

It is believed that many of the problems associated with properly centering a tractor over a guide furrow are due to the fact that different operators see differently. It is well known that most people have one dominant eye. This is the eye that is used for establishing a single line of sight. Most operators align the tractor hood ornament with the guide furrow for centering the tractor but the lines of sight of a left eye dominated operator and right eye dominated operator will result in substantially different positions for the tractor relative to the guide furrow.

The economic effects of improperly aligned crop rows can be devastating. Entire crop rows can be lost due to cultivator blight, particularly in areas where the rows tend to run together. Likewise, at harvest, improperly aligned row crops may be damaged due to misalignment with the harvester.

All of these problems are believed to be resolved by the furrow follower vision correction system of the present invention.

Accordingly, a primary object of the invention is to provide an improved vision correction system for maintaining a tractor in centered relation over an elongated ground furrow or any other type of centerline.

Another object is to provide an adjustable vision correction system which is easily adapted for accommodating a single tractor to several different operators.

Another object is to provide a vision correction system which substantially eliminates the need for adjusting the marker discs of a planter implement to accommodate different operators.

Finally, another object is to provide a vision correction system which is simple in construction, attractive in appearance, economical to manufacture and efficient in operation.

SUMMARY OF THE INVENTION

The vision correction system of the present invention includes a sighting device mounted on a tractor forwardly of the operator seat with freedom of transverse movement relative to the longitudinal center line of the tractor. A locking device is provided for securing the sighting device in a selected transverse position relative to the tractor center line. Accordingly, by adjusting the sighting device to intersect a line of sight from the dominant eye of an operator on the operator seat to an elongated ground mark situated forwardly and centrally of the tractor, the tractor may be maintained in centered relation over the ground mark by steering the tractor to maintain the sighting device in alignment with the ground marker. The mounting structure for the sighting device may be calibrated so that once an operator determines the proper setting of the sighting device for himself on a given tractor, he can quickly and easily adjust the sighting device without any further testing. Since the transversely adjustable sighting device of the present invention compensates for the offset line of sight through an operator's dominant eye, a simple adjustment of the sighting device will enable the tractor to be interchangeably operated by right and left eye dominated drivers with no resulting misalignment or damage to crop rows.

BRIEF DESCRIPTION OF THE DRAWINGS

FIG. 1 is a perspective view of the vision correction device of the invention;

FIG. 2 is a perspective of an alternate embodiment of the invention;

FIG. 3 is a front view of a tractor equipped with the vision correction device of the invention;

FIG. 4 is a plan view showing a couple of tractors in centered and offset relation respectively to a guide furrow; and FIG. 5 is an enlarged detailed plan view showing the line of sight from an operator's dominant eye through the sighting device of the invention.

DESCRIPTION OF THE PREFERRED EMBODIMENTS

FIG. 1 illustrates a vision correction device 10 which is adapted to be mounted on a tractor 12 at the forward end of the hood 14 as shown in FIG. 3.

The device 10 includes a frame or base plate 16 which may be formed to include an elevated central portion 18 adapted to fit over the elevated center strip 20 of the tractor hood 14. The base plate 16 may be fastened to the tractor hood by bolts, rivets or the like inserted through holes 22 or adhesives may be used instead.

A transversely extended mounting strip 24 is secured on base plate 16 for supporting an upright sighting device 26 thereon with freedom of transverse movement therealong. In FIG. 1, mounting strip 24 is shown as an elongated semicircular shaped strip of spring steel, rigid plastic or any other material which preferably provides some flexibility. A lower edge 28 of strip 24 is secured to the base plate by welding or the like and an upper edge 30 is provided with transversely spaced apart detents 32 along the length thereof.

The sighting device 26 may be a flat generally G-shaped plate with a generally semicircular shaped opening 34 for placement in registered relation onto the mounting strip 24 as shown. A tooth 36 extends into a rearward portion of opening 34 for engagement with one of the detents 32 of mounting strip 24. Once the tooth is engaged in a selected detent, the forward end 38 is pushed downwardly to lock the sighting device 26 in the selected position. An elongated lock pin 40 is inserted through a hole 42 in the forward end of the sighting device and through a pair of upstanding ears 44 and 46 at opposite ends of the base plate for releasably securing the sighting device 26 in its adjusted position.

FIG. 2 illustrates an alternate embodiment of the invention. A base plate 48 has an elevated central portion 50 and a transversely extended triangular shaped slide track 52 mounted thereon. The sighting device 54 is an upright half disc secured to an open bottomed bracket 56 having downwardly converging legs 58 and 60 for sliding movement on track 52. A thumbscrew 62 is threadably received through bracket 56 for releasably locking the sighting device 54 at any selected position along the slide track 52.

FIG. 3 illustrates the mounting of vision correction device 10 on a tractor 12 as previously indicated. Note that the elevated center strip 20 on the tractor hood 14 normally corresponds to the longitudinal center line of the tractor and that the vision correction device 10 is mounted for transverse movement of the sighting device 26 to opposite sides of the tractor center line.

The operation of the vision correction device 10 of the present invention will be described with reference to FIGS. 4 and 5. Referring first to the detailed illustration of FIG. 5, there is shown an operator 64 seated on an operator's seat 66 rearwardly of the vision correction device 10. The operator 64 has a dominant right eye indicated at reference numeral 68. With the operator seated upright, his head is centrally positioned relative to the longitudinal center line 70 of the tractor and his right eye 68 is therefore somewhat offset from the center line. If the sighting device 26 is placed in alignment with the tractor center line as indicated in solid lines in FIG. 5, the line of sight on the operator's dominant eye 68 through the solid line sighting device 26 intersects the ground furrow 72, also shown as a solid line, only if the tractor is transversely offset from the ground furrow 72 as shown.

FIG. 5 thus illustrates the basic problem with centering a tractor over a guide furrow. A properly seated operator establishing a line of sight through a centered hood ornament may think he has the tractor properly centered over the guide furrow but because his line of sight is established through one dominant eye rather than through the center of his face, misalignment of the tractor results. This can be corrected by the transversely adjustable sighting device 26 of the device of the present invention.

To properly adjust sighting device 26 on mounting strip 24 for the particular operator 64, the tractor is maneuvered to a position centered over ground furrow 74, indicated by dotted line whereupon the operator seats himself on the operator seat 66 and then adjusts the sighting device 26 to a transverse position intersecting the line of sight between the operator's dominant eye 68 and the ground furrow 74. The operator need only secure the sighting device in its adjusted position and then proceed to advance the tractor, steering the same to align the adjusted sighting device with the ground furrow 74.

Referring to FIG. 4, the left hand dotted line illustration shows the tractor 12 and planter implement 76 properly centered over a guide furrow 78. This is because the sighting device 26 is adjusted to an offset position to the right to accommodate the dominant right eye of operator 64.

The solid line illustration of FIG. 4 however illustrates the type of tractor and implement misalignment which occurs as a result of conventional sighting practices. If the sighting device 26 is centrally positioned over the usual hood center strip 20, a right eye dominated operator sighting through the device 26 will cause the tractor to be rather substantially offset to the right from the guide furrow 80. Whereas the distance from the center of an operator's dominant eye to the center of his face is very small, the misalignment of the tractor can be substantially greater because the small offset of the operator's dominant eye is projected over a greater distance. This is because the operator's eye may be situated six to ten feet above the ground with the sighting device position perhaps six to seven feet in front of the operator. The line of sight from the operator through the sighting device to the ground furrow may intersect the ground furrow at a point thirty to forty feet in front of the tractor.

It is seen in FIGS. 1 and 2 that the mounting strip 24 or slide track 52 of each device may be calibrated to facilitate proper positioning of the respective sighting device. In other words an operator may determine that the sighting device should be positioned at a position 20, for example, for a particular tractor. Accordingly, he can simply set the sighting device at that position and proceed to operate the tractor without prior testing for properly aligning the sighting device.

Whereas the invention has been described in connection with the two embodiments thereof, it is apparent that many modifications, substitutions and alterations may be made which are within the intended broad scope of the appended claims. For example, the vision correction device 10 need not be a hood ornament. It could be independently mounted on the tractor either forwardly of or above the hood by any type of independent mounting means.

Whereas the description refers to properly positioning a tractor relative to guide furrow when planting, the adjustable sighting device of the invention is equally applicable for use with any other type of centerline such as an imaginary line between two rows of crops. It is also apparent that the present invention is applicable for properly centering industrial tractors over any other type of ground marker.

Added advantages of the present invention are that the crop rows don't have to be straight since the vision correction system of the present invention is suitable for all conditions. The invention is particularly helpful for minimum tillage farming wherein it is important that the new rows be planted right on the old ridges. The mounting strip and sighting device are preferably designed to be attractive, to resist rust and the accumulation of dirt, hay and the like.

Thus there has been shown and described a vision correction system which accomplishes at least all of the stated objects.

I claim:
1. In combination,
a tractor having front and rear ends and a forwardly facing operator seat thereon,
A sighting device,
mounting means for supporting said supporting device adjacent the front end of the tractor forwardly of the operator seat and generally transversely centered relative to the tractor, said mounting means providing for adjustment of said sighting device transversely of the tractor, said mounting means comprising a base frame and a transversely extended slide track connected to the base frame, said sighting device being transversely slidably supported on said slide track, lock means for securing said sighting device in a selected transverse position relative to said mounting means whereby, upon adjusting said sighting device to intersect a line of sight from the dominant eye of an operator on said operator seat to an elongated ground marker situated forwardly and transversely centrally of the tractor, the tractor may be maintained in centered relation over the ground marker by steering the tractor to align said ground marker with the adjusted sighting device, said lock means being fixed to said sighting device for transverse movement therewith, and calibration means operatively associated with said slide track whereby various selected transverse positions of the sighting device are identified by said calibration means for facilitated replacement of the sighting device to said selected transverse positions.

2. The apparatus of claim 2 wherein said tractor further comprises an elongated hood extended forwardly of said operator seat, said mounting means being secured to said hood within the line of sight of a tractor operator on said seat.

3. The combination of claim 2 wherein said mounting means is secured to said hood adjacent the forward end thereof.

4. The combination of claim 3 wherein the extent of movement of said sighting device afforded by said mounting means intersects the longitudinal center line of said hood and extends to both sides thereof.

5. A furrow follower vision correction apparatus for a tractor having front and rear ends and a forwardly facing operator seat thereon, said apparatus comprising,
a base frame,
a transversely extended mounting strip secured on said base frame,
a sighting device mounted on the mounting strip with freedom of transverse movement therealong,
lock means for securing said sighting device in selected transverse positions along the mounting strip,
said lock means being fixed to said sighting device for transverse movement therewith,
means for fixedly supporting said base frame at the front end of a tractor at a position generally transversely centered thereon, and
said mounting strip including transversely spaced calibrations whereby various selected transverse positions of the sighting device are identified by the calibrations for facilitated replacement of the sighting device to said selected transverse positions.

6. The apparatus of claim 5 wherein said lock means is fixed to said sighting device for transverse movement therewith.

7. A furrow follower vision correction apparatus for a tractor having front and rear ends and a forwardly facing operator seat thereon, said apparatus comprising,
a sighting device,
mounting means for supporting said sighting device on the tractor forwardly of the operator seat with freedom of transverse movement relative to the longitudinal center line of the tractor, and
lock means for securing said sighting device in a selected transverse position along said mounting means,
said mounting means comprising a base frame and a transversely extended slide track connected to the base frame, said sighting device being transversely slidably supported on said slide track, and
said slide track including a plurality of transversely spaced apart detents, said sighting device being registrable with a selected detent for securing said sighting device against transverse movement and further comprising removable retention means for retaining said sighting device in registered relation with a selected detent.

* * * * *